Nov. 27, 1923.

M. L. WARNER

PERCOLATOR

Filed Dec. 13, 1921

Inventor
MAURICE L. WARNER.
By his Attorneys

Nov. 27, 1923.
M. L. WARNER
1,475,334
PERCOLATOR
Filed Dec. 13, 1921  2 Sheets-Sheet 2
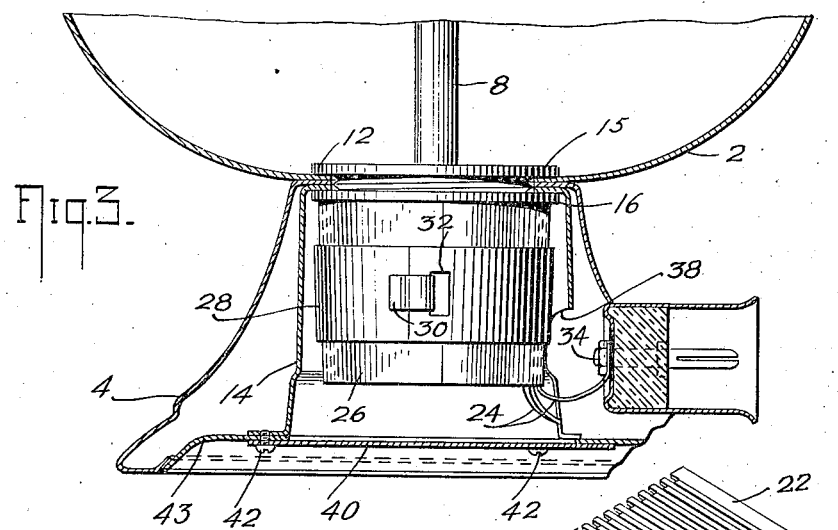
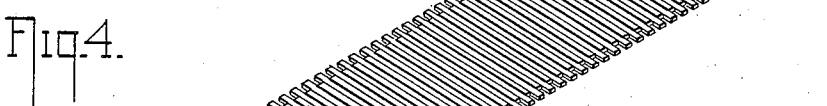
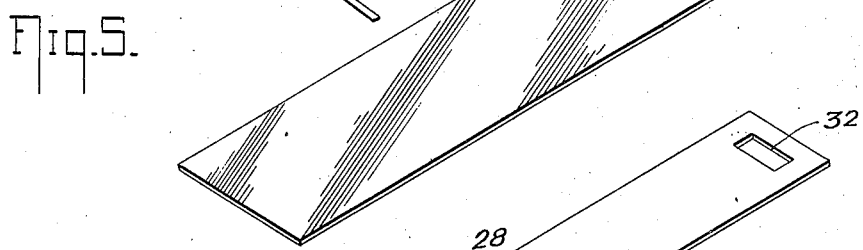
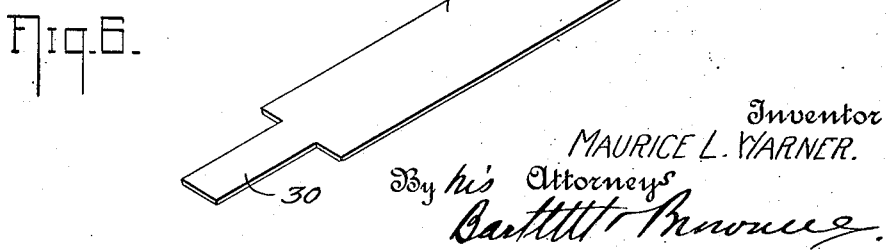
Inventor
MAURICE L. WARNER.
By his Attorneys Patented Nov. 27, 1923.

1,475,334

UNITED STATES PATENT OFFICE.

MAURICE L. WARNER, OF MERIDEN, CONNECTICUT, ASSIGNOR TO MANNING, BOWMAN & COMPANY, OF MERIDEN, CONNECTICUT, A CORPORATION OF CONNECTICUT.

PERCOLATOR.

Application filed December 13, 1921. Serial No. 521,970.

*To all whom it may concern:*

Be it known that I, MAURICE L. WARNER, a citizen of the United States, residing at Meriden, county of New Haven, State of Connecticut, have invented a certain new and useful Improvement in Percolators, of which the following is a full, clear, and exact description.

The present invention relates to percolators and the like.

An object of the invention is to provide a novel and improved utensil of this character.

Another object of the invention is to provide a novel and improved heating chamber for a percolator.

Another object of the invention is to provide a novel and improved electrically heated percolator, and heating device therefor.

With these and other objects in view, the features of the invention consist in certain constructions, arrangements and combinations of parts hereinafter described and claimed, the advantages of which will be obvious to those skilled in the art.

The several features of the invention will be clearly understood from the following description and accompanying drawings in which—

Fig. 3 is a view similar to Fig. 1 but with the heating chamber and heating device shown in elevation; and Figs. 4, 5 and 6 are detailed views in perspective of component parts of the heating device.

Figure 1:
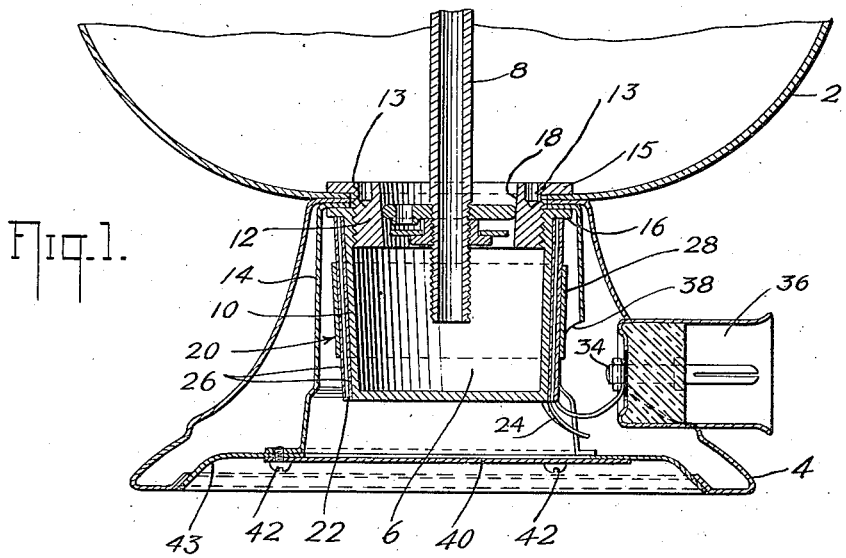
Figure 1 is a vertical sectional view of a portion of an electrically heated percolator embodying the features of the invention in their preferred form.
Figure 2:
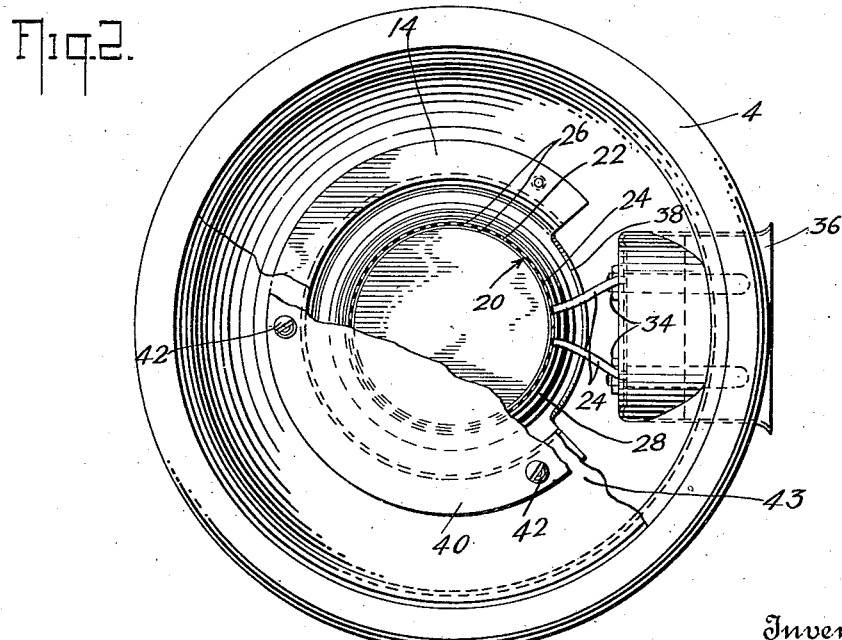
Fig. 2 is a bottom plan view, with parts broken away of the portion of the percolator illustrated in Fig. 1.

The percolator illustrated in the drawings is provided with a liquid container 2, a supporting base 4, a heating chamber 6, and a percolator tube 8 which is mounted in the upper end portion of the heating chamber. The percolator tube may be of any suitable construction, but preferably is of the construction described and claimed in my Letters Patent No. 1,423,475, dated July 18, 1922.

As illustrated the heating chamber 6 comprises a cup-shaped member 10 and a nut 12 having spanner wrench holes 13, which nut extends through registering apertures in the bottom of the container 2, the top of the base 4, and the inwardly flanged top of an apron 14 hereinafter described, and is screw-threaded into the upper end of the cup-shaped member 10. The upper ends of the nut 12 and the cup-shaped member 10 are provided with outwardly projecting flanges 15 and 16, respectively, which cooperate to clamp the liquid container, base 4, and apron 14 between them. The nut 12 is provided with a central opening 18 through which the percolator tube 8 extends.

The liquid receptacle 6 as shown is provided with an electrical heating device 20 which is in the form of a sleeve. The heating device in the form shown is made of flexible material and the outer surface of the cup-shaped member 10 of the liquid receptacle is tapered downwardly slightly so as to enable the sleeve-like heating device to be easily slipped over the cup-shaped member and securely held thereon by frictional engagement. The heating device comprises a strip 22 of mica or other insulating material upon which a heating element 24 is spirally wound as shown in Fig. 4, the heating element consisting of a flat wire. The strip 22 with the heating element wound thereon is interposed between slips 26 of mica, and the ends of the composite strip thus formed are brought together to form a sleeve and are held in position by means of an encircling strap 28, the ends of the strap being secured together by means of a tongue 30 on one end which is passed through a slot 32 on the other end and is bent over as shown in Fig. 3. After the heating device is mounted on the liquid receptacle 6, the ends of the heating element or wire 24 may be secured to the binding posts 34 of the usual plug socket 36 mounted on the base 4, an opening 38 being provided in the apron 14 to enable the ends of the wire 24 to be passed therethrough.

The apron 14 surrounds the liquid receptacle 6 and heating device and is spaced away therefrom and from the base 4. The lower end of the apron is closed by a cover 40 which is removably secured by screws 42 to an outwardly projecting flange on the lower end of the apron. The apron effectively protects the base of the percolator from becoming discolored by heat from the heating device and together with the cover 40 retains the heat within it. A ring 43 extending outwardly toward the base is held between the lower flange of the apron 14 and the cover 40.

It will be apparent that with this construction of liquid receptacle and sleeve-like heating device that the heating device may be easily removed and installed, it being only necessary in order to permit the heating device to be slipped off of the liquid receptacle to first remove the cover 40 from the apron and then to detach the resistance wires 24 from the socket terminals. Heretofore, in some constructions it has been customary to ship the whole percolator to the factory for the installation of a new heating element, since, although an unskilled operator could unscrew the nut which secures the heating chamber to the container, it is very difficult without the proper tools to replace the nut so as to insure against leakage at the bottom of the liquid container. It will be apparent that all of these difficulties are avoided by the present construction on account of the ease with which the heating device can be removed and replaced when necessary.

The construction of the heating chamber and the sleeve-like heating device results in the heating device being highly efficient and on account of the cylindrical arrangement of these parts they take up but little space with relation to the capacity of the base 4. Also on account of this cylindrical arrangement the protecting apron 14 may be made of correspondingly small diameter. By the use of the nut 12 which is screw-threaded into the interior of the cup-shaped member of the heating chamber, the opening in the nut can be made small enough to accommodate the standard size percolator tube and the heating chamber may be made larger than is possible in a construction in which the nut is screw-threaded upon the exterior of the cup-shaped member.

The lower end of the percolator tube is removed for some distance from the bottom of the heating chamber so that when the hot water is expelled a considerable amount of hot water will still remain in the chamber. This not only affords a protection to the apparatus but quickly raises the temperature of any water which may flow into the heating chamber, so that it is nearer the boiling point than would otherwise be the case.

While it is preferred to employ the specific construction and arrangement of parts illustrated and described, it is to be understood that this construction and arrangement is not essential except so far as specified in the claims and may be changed or modified without departing from the broader features of the invention.

What I claim is:

1. A device of the class described having, in combination, a liquid container having a cup-shaped member extending downwardly therefrom, and a heating device of flexible material in the form of a sleeve telescopingly engaging the exterior of said cup-shaped member and held thereon by frictional engagement.

2. A device of the class described having, in combination, a liquid container having a cup-shaped member extending downwardly therefrom, and a heating device in the form of a detachable sleeve in telescoping engagement with the exterior of said cup-shaped member.

3. A device of the class described having, in combination, a liquid container having a cup-shaped member extending downwardly therefrom and externally tapering downwardly, and a heating device in the form of a sleeve telescopingly engaging said member and held thereon by frictional engagement.

4. A device of the class described having, in combination, a liquid container having a cup-shaped member extending downwardly therefrom, and a heating device in the form of a sleeve surrounding said cup-shaped member, said heating device comprising a composite strip made up of a strip of insulating material, a heating element coiled about said strip, strips of insulating material on the sides of said first mentioned strip for covering said heating element, and means for holding the parts of said composite strip in position to form the sleeve.

5. A device of the class described having, in combination, a liquid container having a cup-shaped member extending downwardly therefrom and externally tapered downwardly, a heating element surrounding said tapered portion, and means for insulating said element from said member.

6. A device of the class described having, in combination, a liquid container having a cup-shaped member extending downwardly therefrom, and a heating device for the cup-shaped member comprising two strips of insulating material arranged one over the other and surrounding said member, a heating element interposed between said strips, and means for holding said strips and heating element against said member.

7. A device of the class described having, in combination, a liquid container having a cup-shaped member extending downwardly therefrom, a heating device surrounding said member, an apron surrounding and spaced away from said member and heating device, and a supporting base for the container surrounding and spaced away from said apron.

8. A device of the class described having in combination, a liquid container having an opening in its lower end and a heating chamber secured to the container comprising a cup-shaped member, and a nut extending through said opening and screw-threaded into the upper end of said member, having a flange to cooperate with the bottom of said receptacle to clamp said container between them.

9. A device of the class described having, in combination, a liquid container having an opening in its lower end, a base for the container having an opening in its upper end registering with the opening in the container, and a heating chamber comprising a cup-shaped member having its upper end provided with a flange, and a nut extending through the openings in the container and base and screw-threaded into the upper end of the cup-shaped member and having a flange to cooperate with the flange on the cup-shaped member to clamp the container and base between them.

10. A device of the class described having, in combination, a liquid container having an opening in its lower end, a base for the container having an opening in its upper end registering with the opening in the container, an apron having an opening in its upper end registering with the openings in the container and base, and a heating chamber comprising a cup-shaped member inclosed by the apron, and a nut extending through the openings in the container, base and apron and screw-threaded into the upper end of the cup-shaped member and having a flange to cooperate with the upper end of the cup-shaped member to clamp the container, base and apron between them.

11. A percolator having, in combination, a liquid container having a cup-shaped member extending downwardly therefrom, an annular member screw-threaded into the upper end of said member, and a percolator tube mounted in said annular member.

12. A device of the class described having, in combination, a liquid container having a heating chamber extending downwardly therefrom, a heating device surrounding said chamber, and heat retaining means comprising a wall surrounding said heating device and the downwardly extending chamber and spaced a distance therefrom, and a bottom wall spaced a distance from the bottom of said heating device and chamber.

13. A device of the class described having. in combination, a liquid container having a heating chamber extending downwardly therefrom, a heating device surrounding said chamber, heat retaining means comprising a wall surrounding said heating device and chamber, and a bottom wall spaced a distance from the bottom of said chamber, and a support for said liquid container having a portion of its wall surrounding and spaced a distance from said first mentioned wall.

MAURICE L. WARNER.